United States Patent Office 3,567,758
Patented Mar. 2, 1971

3,567,758
PREPARATION OF HYDROXYBENZONITRILES
Basil Jason Heywood, Dagenham, England, assignor to
May & Baker Limited, Essex, England
No Drawing. Filed May 2, 1968, Ser. No. 726,225
Claims priority, application Great Britain, May 5, 1967,
21,145/67; Aug. 25, 1967, 39,302/67
Int. Cl. C07c *121/74*
U.S. Cl. 260—465                       16 Claims

ABSTRACT OF THE DISCLOSURE

Hydroxybenzonitriles of the general formula:

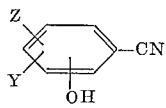

wherein Y represents hydrogen or halogen, or alkyl of from 1 through 4 carbon atoms, and Z represents hydrogen or halogen, or alkyl of from 1 through 4 carbon atoms, or alkali metal salts thereof, are prepared by dealkylating an alkoxybenzonitrile of the general formula:

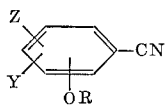

(wherein R represents alkyl of from 1 through 4 carbon atoms) by reaction with a phenol derivative of the general formula:

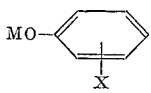

(wherein M represents hydrogen or an atom of an alkali metal, and X represents hydrogen or halogen, or alkyl of from 1 through 4 carbon atoms) and, when M represents an alkali metal atom, optionally converting the alkali metal salt of hydroxybenzonitrile product thus obtained into the hydroxy compound.

---

This invention relates to a process for the preparation of hydroxybenzonitriles.

More especially, it relates to a process for the preparation of hydroxybenzonitriles of the general formula:

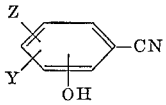        (I)

wherein Y represents a hydrogen or halogen atom, or an alkyl group containing from 1 to 4 carbon atoms, and Z represents a hydrogen or halogen atom, or an alkyl group containing from 1 to 4 carbon atoms.

Hydroxybenzonitriles of the general Formula I are employed as herbicides or as intermediates in the preparation of compounds active as herbicides and other pesticides.

Hydroxybenzonitriles of the general Formula I have hitherto been prepared by (a) decomposing p-trichloroacetiminophenol hydrochloride in the presence of sodium hydroxide with a yield of 25% [J. Houben and W. Fischer, Ber. 63, 2649 (1930)], (b) applying Sandmeyer's reaction to aminophenols and treating the diazonium chloride formed with cuprous cyanide [F. Ahrens, Ber. 20, 2953 (1887); A. Iakoubovitch et coll., J. Obchtechei Khim. 28, (90), 2294 (1958); J. N. Ashley et coll., J. Chem. Soc. 1942, 103], (c) carrying out Rosenmund and von Braun's reaction with a halophenol, e.g. a bromophenol, and cuprous cyanide in the presence of a tertiary base [W. N. White et coll., J. Amer. Chem. Soc. 80, 3271 (1958); U.S. Pat. No. 3,259,646], (d) dehydrating hydroxybenzaldoximes with acetic anhydride [E. Beckmann, Ber. 26, 2623 (1893); Lack, Ber. 17, 1572 (1884); Auwers and Reis, Ber. 29 (2), 2355 (1896)], or (e) by heating ammonium 3-hydroxybenzoate [Smith J. Prakt. Chem. /2/ 16 221 (1877)]

All these processes have the disadvantage either that the starting materials used therein are difficult to obtain, or that the hydroxybenzonitrile yields which they give are of a low order. At best, the yields by the Sandmeyer reaction are of the order of 65–70%, but the diazotisation step involved is always a difficult operation to carry out on an industrial scale. Often, to obtain a hydroxybenzonitrile of satisfactory purity, these processes involve complicated and industrially inconvenient extraction procedures.

Very recently, improved processes for the preparation of hydroxybenzonitriles, including 4-hydroxybenzonitriles and intermediates in their preparation have been described as follows:

(f) heating anisic acid with a nitrile, the boiling point of which and of the corresponding acid are higher than that of anisonitrile, e.g. adiponitrile, and demethylating the anisonitrile obtained, as described in British patent specification No. 1,065,936, and (g) subjecting an alkyl ether of phenol having a nuclear alkyl substituent in addition to the ether group, e.g. a 4-alkoxytoluene, wherein the alkoxy group advantageously contains not more than 4 carbon atoms, such as 4-methoxytoluene or 4-ethoxytoluene, to the action of a mixture of oxygen and ammonia at a temperature between 300° and 600° C. in the presence of a catalyst based upon oxides of metals or metalloids, and dealkylating the alkoxybenzonitrile (e.g. anisonitrile) obtained, as described in British patent specification No. 1,096,961.

The dealkylation step required to convert the alkoxybenzonitrile intermediates obtained in these two processes into hydroxybenzonitriles has hitherto been carried out by a known procedure which consists of heating the alkoxybenzonitrile with pyridine hydrochloride. This method has certain disadvantages in that a relatively large amount (at least equimolar in relation to the alkoxybenzonitrile) of a comparatively expensive material, pyridine, is required, which must be recovered if the process is to be economic, and the alkyl chloride by-product is frequently unwanted.

As a result of research and experimentation, a new and advantageous method has been found for the dealkylation of alkoxybenzonitriles, more especially 4-alkoxybenzonitriles, of the general formula:

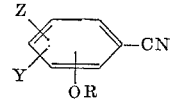        (II)

wherein R represents an alkyl group containing from 1 to 4 carbon atoms, preferably a methyl group, and Y and Z are as hereinbefore defined, to give hydroxybenzonitriles of general Formula I. The new method avoids the use of pyridine hydrochloride and can yield as by-product substances which are required as initial or starting materials in processes (f) and (g) described above.

According to the present invention, the dealkylation of the alkoxybenzonitriles of general Formula II to hydroxybenzonitriles of general Formula I is effected by the action of a phenol derivative of the general formula:

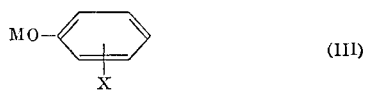

wherein M represents a hydrogen atom or an atom of an alkali metal, preferably sodium or potassium, and X represents a hydrogen or halogen atom, or an alkyl group containing from 1 to 4 carbon atoms. In the case where M represents an alkali metal atom, hydroxybenzonitriles of Formula I are obtained in the form of alkali metal salts, and the salts may, if desired, be converted (preferably in situ) in manner known per se, e.g. by treatment with an acid such as hydrochloric acid, into the hydroxy compounds. As by-product there is obtained an alkoxybenzene of formula:

wherein R and X are as hereinbefore defined.

When M in Formula III represents a hydrogen atom, e.g. the reactant is phenol or 4-cresol, the reaction is carried out at a temperature within the range 250°–500° C. (preferably at a temperature between 300° and 400° C.) under pressure, or as a vapour phase reaction, for example by passing the reactants in the vapour state through a hot tube within the same temperature range. When M represents an atom of an alkali metal, the reaction is preferably carried out by heating the substantially anhydrous alkali metal phenoxide with the alkoxybenzonitrile, preferably at a temperature of 140°–290° C., and optionally in the presence of an inert medium which may serve as a solvent, e.g., an aprotic medium such as dimethylformamide or N-methylpyrrolidone or a mineral oil of suitably high boiling point such as Bayol 85, and if desired under sub-atmospheric pressure, whereby removal of the alkoxybenzene by-product is facilitated.

The dealkylation of alkoxybenzonitriles by the process of the present invention generally gives rise to high yields of hydroxybenzonitriles. This is particularly so when the reactant of general Formula III is an alkali metal phenoxide, e.g. sodium 4-methylphenoxide or sodium phenoxide, and the reactant of Formula II is 4-methoxybenzonitrile, 3,5 - dichloro - 4 - methoxybenzonitrile or 3,5-dibromo-4-methoxybenzonitrile, yields of 70% and above of hydroxybenzonitriles usually being obtained.

Preferably the reactant of Formula III is 4-cresol or an alkali metal 4-cresylate, i.e. an alkali metal 4-methylphenoxide. With these reactants the 4-methylphenyl alkyl ether, e.g. 4-methylphenyl methyl ether or 4-methoxytoluene, obtained as by-product is suitable (1) as a starting material for the preparation of anisic acid used as the starting material in process (f) described above, and
(2) as a starting material in process (g) described above.

Accordingly, the process of the persent invention is advantageously utilised with 4-cresol or an alkali metal 4-cresylate as the reactant of Formula III in the demethylation step of process (f) and in the dealkylation of 4-alkoxybenzonitriles, particularly 4-methoxybenzonitrile, obtained by process (g).

The following examples illustrate the new process of the present invention. All melting points were determined by the capillary tube method unless otherwise indicated. Yields are expressed in terms of those which would be obtained by complete conversion of the alkoxybenzonitrile starting materials unless otherwise indicated.

EXAMPLE I

A mixture of 4-methoxybenzonitrile (2.66 g.; 0.02 mole) and anhydrous powdered sodium 4-methylphenoxide (2.93 g.; 0.021 mole; prepared by azeotropic removal of water from an aqueous solution of sodium 4-methylphenoxide with chlorobenzene) were heated together in a 50 ml. flask fitted for distillation. Heating was by means of a metal bath. The temperature of the bath was initially 1606° C. and was increased from 160° C. to 260° C. in 10 minutes and held at 260° C. for 1 hour 20 minutes, by which time the theoretical yield of 4-methylphenyl methyl ether had been collected. The residual solid was cooled to laboratory temperature and washed with petroleum ether (B.P. 40°–60° C.; 10 ml.). The solid residue was dissolved in water (50 ml.) and concentrated hydrochloric acid added to pH 1. The precipitated solid was collected and dried to give 4-hydroxybenzonitrile (1.64 g.; yield 68.8%), M.P. 100°–104° C. The aqueous phase was twice extracted with diethyl ether (50 ml. and 25 ml.) and the combined ethereal extracts evaporated to dryness to give a second crop of 4-hydroxybenzonitrile (0.59 g.; yield 24.8%), M.P. 98°–107° C.

2.44 g. (yield 100%) of 4-methylphenyl methyl ether, refractive index $n_D^{21} = 1.519$, was collected during the reaction.

EXAMPLE II

A mixture of 4-methoxybenzonitrile 2.66 g.; 0.02 mole) and anhydrous powdered sodium phenoxide (2.4 g.; 0.021 mole; prepared by drying an aqueous solution of sodium hydroxide and phenol) were heated together in a 50 ml. flask fitted for distillation.

Heating was by means of a metal bath, the temperature of which was increased from 100° C. to 280° C. over 20 minutes. At a bath temperature of 180° C. the mixture of reactants gave a clear melt, and at 230°C. it boiled vigorously and the anisole formed in the reaction started to distil. The melt resolidified when the temperature reached 230° C. The reaction mixture was held at a temperature of 280° C. until 1.92 g. anisole (yield 89%) had been recovered. After cooling to laboratory temperature, the solid was powdered, washed with 40/60 petroleum ether and, after drying, dissolved in water (10 ml.). The solution was treated with charcoal and the filtered solution acidified with concentrated hydrochloric acid to pH 1. The precipitate was collected and dried to give 4-hydroxybenzonitrile (1.82 g.; yield 76.5%), M.P. 91°–120° C.

EXAMPLE III

A very concentrated solution of sodium 4-methyl-phenoxide was prepared from 4-cresol (10.8 g.; 0.1 mole) and sodium hydroxide (4.0 g.; 0.1 mole). This solution was added slowly to stirred vigorously boiling 4-methoxytoluene in an apparatus fitted for the azeotropic removal of water and the return of the organic solvent. The rate of addition was such that the solid sodium 4-methylphenoxide, once formed, did not redissolve. When the addition was complete, the solvent was partially removed to give a readily stirrable slurry of sodium 4-methylphenoxide. 4-methoxybenzonitrile (13.3 g.; 0.1 mole) was added. By allowing further amounts of 4-methoxytoluene to distil, the internal temperature was increased to 203° C. and the suspension stirred and refluxed for 1½ hours. The temperature was again allowed to rise to 225° C. by removal of more solvent and held at this temperature for two hours. The reaction mixture was then cooled and the 4-hydroxybenzonitrile extracted as described in Example I to give 4-hydroxybenzonitrile (8.43 g.; yield 71%) M.P. 103°–104° C.

From the petroleum ether washings 4-methoxybenzonitrile (0.76 g.), M.P. 56°–57° C., was recovered. (Theoretical yield based on 4-methoxybenzonitrile not recovered = 77%.)

EXAMPLE IV

Proceeding as in Example III but replacing the sodium hydroxide by 85% solid potassium hydroxide (5.6 g.; 0.085 mole) and extracting the 4-hydroxybenzonitrile as described in Example I, a first crop of 6.4 g. (yield 54%) of 4-hydroxybenzonitrile, M.P. 111°–112° C., and a second crop of 2.54 g. (yield 21%) of 4-hydroxybenzonitrile, M.P. 108°–110° C., was obtained.

EXAMPLE V

A mixture of 4-methoxy-3,5-dibromobenzonitrile (5.82 g.; 0.02 mole) and anhydrous powdered sodium 4-methylphenoxide (2.73 g.; 0.021 mole; prepared by azeotropic removal of water from an aqueous solution of sodium 4-methylphenoxide with chlorobenzene) were heated together in a 50 ml. flask fitted for distillation. Heating was by means of a metal bath; the bath temperature was held at 230°–250° C. over 1¼ hours by which time 98% of the theoretical amount of 4-methylphenyl methyl ether had been collected. The residual solid was cooled to laboratory temperature and washed with petroleum ether (B.P. 40°–60° C.; 2× 10 ml.). The solid residue was dissolved in water (80 ml.), filtered and the filtrate acidified to pH 1 with concentrated hydrochloric acid. The precipitated solid was collected and dried to give 4-hydroxy-3,5-dibromobenzonitrile (4:41 g.; yield 80.5%), M.P. 177°–190° C. (M.P. pure 4-hydroxy-3,5-dibromobenzonitrile 195°–196° C., mixed M.P. 191°–195° C.).

By proceeding in a similar manner, the following compounds were prepared:

3-chloro-4-hydroxybenzonitrile, in 86.5% yield from 3-chloro-4 - methoxybenzonitrile and sodium 4-methylphenoxide, M.P. 135°–142° C. (M.P. pure 3-chloro-4-hydroxybenzonitrile 149°–150° C., fixed M.P. 140°–146° C.);

3,5-dichloro-4-hydroxybenzonitrile in 97% yield from 3,5-dichloro-4-methoxybenzonitrile and sodium 4-methylphenoxide, M.P. 127°–145° C., raised by recrystallisation to 140°–143° C. (M.P. pure 3,5-dichloro-4-hydroxybenzonitrile 146°–147° C.);

3-bromo-4-hydroxybenzonitrile from 3 - bromo-4-methoxybenzonitrile and sodium phenoxide, M.P. 145°–146° C. (M.P. pure 3-bromo-4-hydroxybenzonitrile 156°–158° C., mixed M.P. 148°–149° C.);

3,5-dibromo-4-hydroxybenzonitrile in 80.5% yield from 3,5-dibromo-4-methoxybenzonitrile and sodium 4-methylphenoxide, M.P. 177°–190° C. (M.P. pure 3,5-dibromo-4-hydroxybenzonitrile 195°–196° C., mixed M.P. 191°–195° C.);

4-hydroxy-3-iodobenzonitrile from 3-iodo-4-methoxybenzonitrile and sodium phenoxide, M.P. 121°–123° C. (M.P. pure 4-hydroxy-3-iodobenzonitrile 136°–137° C., mixed M.P. 127°–129° C.), and 4-hydroxy - 3 - methylbenzonitrile from 4-methoxy-3-methylbenzonitrile and sodium phenoxide, M.P. 80°–81° C. (M.P. pure 4-hydroxy-3-methylbenzonitrile 92°–94° C., mixed M.P. 86°–87° C.).

EXAMPLE VI

A mixture of 4-methoxybenzonitrile (2.66 g.; 0.02 mole) and anhydrous powdered sodium 4-chlorophenoxide (3.16 g.; 0.021 mole; prepared by azeotropic removal of water from an aqueous solution of sodium 4-chlorophenoxide with chlorobenzene) were heated together in a 50 ml. flask for 3 hours. Heating was by means of a metal bath, the bath temperature was held at 250°–255° C. At a bath temperature of 140° C. the mixture of reactants gave a clear melt; the melt resolidified when the bath temperature had been at 250° C. for 20 minutes. The residual solid was cooled to laboratory temperature and dissolved in water (20 ml.). The aqueous solution was washed with diethyl ether (2× 10 ml.) before acidifying to pH 1 with concentrated nitric acid. An oily product was obtained which solidified on cooling. It was recrystallised from benzene to give 4-hydroxybenzonitrile (1.07 g.; 45% yield), M.P. 102°–108° C.

EXAMPLE VII

A mixture of 4-methoxybenzonitrile (2.67 g.; 0.02 mole) and anhydrous sodium 4-bromophenoxide (4.10 g.; 0.021 mole; prepared by azeotropic removal of water from an aqueous solution of sodium 4-bromo-phenoxide with chlorobenzene) were refluxed together in N-methylpyrrolidone (20 ml.) for 5 hours. The solvent was removed by distillation and the residue dissolved in water (20 ml.). The solution was washed with diethyl ether (2× 10 ml.), treated with charcoal and the filtered solution acidified with concentrated hydrochloric acid to pH 1. The precipitated solid was collected and dried to give 4-hydroxybenzonitrile (1.2 g.; yield 32%), M.P. 106°–107° C.

EXAMPLE VIII

A mixture of 3-methoxybenzonitrile (2.66 g.; 0.02 mole) and anhydrous powdered sodium 4-methylphenoxide (2.73 g.; 0.021 mole; prepared by azeotropic removal of water from an aqueous solution of sodium 4-methylphenoxide with chlorobenzene) were heated together in a 50 ml. flask fitted for distillation. Heating was by means of a metal bath. The temperature of the bath was initially 115° C.; the temperature was raised to 230° C. when the 4-methylphenyl methyl ether commenced to distil over. The bath temperature was maintained at 230°–260° C. for 2 hours by which time the theoretical amount of 4-methylphenyl methyl ether had been collected. The residual solid was cooled to laboratory temperature and washed with petroleum ether (B.P. 40°–60° C.; 2× 10 ml.). The solid residue was dissolved in water treated with charcoal and the filtered solution acidified with concentrated hydrochloric acid to pH 1. The precipitate was collected and dried to give 3-hydroxybenzonitrile (0.44 g.; yield 18.5%), M.P. 66°–69° C. By extracting the mother liquors with diethyl ether (2× 15 ml.) a further 0.85 g. was obtained (yield 35.5%), M.P. 65°–70° C. (Total crude yield 1.29 g.; 54%). The total crude product was recrystallised from benzene to give 0.84 g. (yield 35%), M.P. 73°–75° C. Lit. M.P. 80° C.

EXAMPLE IX

A mixture of 2-methoxybenzonitrile (2.66 g.; 0.02 mole) and anhydrous powdered sodium phenoxide (2.45 g.; 0.02 mole; prepared by azeotropic removal of water from an aqueous solution of sodium phenoxide with chlorobenzene) were heated together in a 50 ml. flask fitted for distillation. Heating was by means of a metal bath, the bath temperature being maintained at 240°–270° C.; the phenyl methyl ether was allowed to distil out over 1½ hours. The residual solid was cooled to laboratory temperature and washed with petroleum ether (B.P. 40°–60° C.; 2× 10 ml.). The solid residue was dissolved in the minimum amount of water, treated with charcoal and the filtered solution acidified with concentrated hydrochloric acid to pH 1. An oil separated which solidified on cooling to give 2-hydroxybenzonitrile (1.49 g.; yield 62.5%), M.P. 84°–86° C. Lit. M.P. 92° C.

EXAMPLE X

A mixture of 4-methoxybenzonitrile (13.3 g.; 0.1 mole) and anhydrous powdered sodium 4-methylphenoxide (13.66 g.; 0.105 mole; prepared by azeotropic removal of water from an aqueous solution of sodium 4-methylphenoxide with chlorobenzene) was heated in a 250 ml. flask fitted with a distillation head, thermometer and distillation condenser. Heating was by means of a Woods metal bath, the bath temperature being 240°–260° C. 4-methylphenyl methyl ether was allowed to distil off as it formed over a period of 2 hours, and finally removed under reduced pressure. The weight of 4-methylphenyl methyl ether collected was 10.07 g. (yield 82%). The residue was triturated with petroleum ether (B.P. 40°–60° C.; 2× 25 ml.) to remove unchanged 4-methoxybenzonitrile, the petrol removed by decantation and the residue of crude sodium 4-cyanophenoxide dried by warming on a steam bath. The residue was then taken up in distilled water (50 ml.), treated with charcoal and filtered.

The filtrate was then acidified with concentrated hydrochloric acid to pH 1. The precipitate was collected and dried in a desiccator over silica-gel, to give 4-hydroxybenzonitrile (10.04 g.; yield 84%), M.P. 102°–106° C. A second crop of 4-hydroxybenzonitrile was obtained by extracting the mother liquors with diethyl ether (2× 25 ml.) and evaporating to dryness to give a product (1.01 g.; yield 8.4%), M.P. 70°–95° C., which was recrystallized from a small quantity of benzene to give 4-hydroxybenzonitrile (0.6 g.; yield 5.5%), M.P. 105°–108° C.

EXAMPLE XI

Phenol (9.4 g.; 0.1 mole) was dissolved in a solution obtained from 85% solid potassium hydroxide (6.5 g.; 0.1 mole) and distilled water (20 ml.) and the solution obtained added dropwise over one hour to boiling chlorobenzene (50 ml.) in a 100 ml. flask fitted with a stirrer, dropping funnel and distillation condenser, chlorobenzene being added simultaneously to replace that which distilled off and care being taken to ensure that some solid potassium phenoxide product was present at all times during the addition, since if this is not done the potassium phenoxide comes out of solution at the end of the reaction with a very vigorous evolution of heat. When all the water had been removed, the chlorobenzene was distilled off, finally under reduced pressure, 4-methoxybenzonitrile (13.3 g.; 0.1 mole) was then added to the dry potassium phenoxide thus obtained. The mixture was heated in a Woods metal bath at a bath temperature of 230°–240° C. for 2 hours, anisole being allowed to distil off as it was formed. The weight of anisole collected was 10.09 g. (yield 93.5%). The residue was triturated with petroleum ether (B.P. 40°–60° C.; 2× 50 ml.), the petrol removed by decantation and the residue dried by gentle heating on a steam bath. Evaporation of the petrol washings gave 4-methoxybenzonitrile (0.19 g.). The residue was taken up in distilled water (50 ml.), treated with charcoal and filtered. The filtrate was acidified with concentrated hydrochloric acid to pH 1. The precipitate was collected and dried in a desiccator over silca-gel, to give 4-hydroxybenzonitrile (10.6 g.; yield 89%), M.P. 110°–111° C. A second crop of 4-hydroxybenzonitrile was obtained by extracting the mother liquors with diethyl ether (2× 50 ml.). The ether was then removed in a rotary evaporator and the oily residue crystallised from benzene to give 4-hydroxybenzonitrile (0.28 g.; yield 2.3%), M.P. 106°–109° C.

EXAMPLE XII 4-cresol (10.8 g.; 0.1 mole) was dissolved in a solution obtained from 85% solid potassium hydroxide (6.5 g.; 0.1 mole) and distilled water (20 ml.) and the solution obtained added dropwise, with stirring, over 2 hours to boiling chlorobenzene (50 ml.) in a 100 ml. flask fitted with a stirrer, dropping funnel and azeotropic distillation head, care being taken to ensure that some solid potassium 4-methylphenoxide product was present at all times during the addition, since if this is not done the potassium 4-methylphenoxide comes out of solution at the end of the reaction with a very vigorous evolution of heat. The chlorobenzene was refluxed until all the water had been removed and was then distilled off, finally under reduced pressure. 4-methoxybenzonitrile (13.3 g.; 0.1 mole) was then added to the dry potassium 4-methylphenoxide, the reaction flask transferred to a Woods metal bath, the stirrer removed and the mixture heated at 235°–250° C. for 2 hours, 4-methylphenyl methyl ether being allowed to distil off as it was formed. The weight of 4-methylphenyl methyl ether collected was 12.02 g. (yield 98.5%). The residue was triturated with petroleum ether (B.P. 40°–60° C.; 2× 50 ml.), the petrol removed by decantation and the residue dried by gentle heating on a steam bath. Evaporation of the petrol washings gave 4-methoxybenzonitrile (0.13 g.). The residue was taken up in distilled water (50 ml.), treated with charcoal and filtered. The filtrate was acidified with concentrated hydrochloric acid to pH 1. The precipitate was collected and dried in a desiccator over silica-gel, to give 4-hydroxybenzonitrile (10.75 g.; yield 90.4%), M.P. 108°–109° C. A second crop of 4-hydroxybenzonitrile was obtained by extracting the mother liquors with diethyl ether (2× 50 ml.) The ether was then removed on a rotary evaporator to give 4-hydroxybenzonitrile (0.57 g.; yield 4.8%), M.P. 100°–106° C.

EXAMPLE XIII

Phenol (20 g.), sodium hydroxide solution (27.1 g.; 40% w./v.) and anisole (150 ml.) were stirred under nitrogen and heated in a metal bath to 148° C. Water was removed azeotropically throughout the heating, and 100 ml. of distillate (B.P. 87°–148° C.), containing 22 ml. of water, was collected. The theoretical total for 100% conversion of phenol to sodium phenoxide is 22.5 ml. of water.

The heating was stopped and a mixture of Bayol 85 oil (a high-boiling mineral oil; 100 ml.) and 4-methoxybenzonitrile (26.6 g.) was added at 105° C. The heating was continued to distil out the added anisole. Distillation ceased when the mixture reached 192° C., a total of 147 ml. of anisole having been collected (B.P. 144°–147° C.). A further 1 ml. of anisole was collected by continuing the distillation under reduced pressure (250 mm. Hg.). Thus a total of 148 ml. of anisole was recovered from the 150 ml. added initially.

The mixture was then heated more strongly, at atmospheric pressure under nitrogen with stirring, to effect functional exchange between the sodium phenoxide and the 4-methoxybenzonitrile. When the temperature of the mixture reached 240° C. anisole, formed as by-product, commenced distilling. The heating was continued until the temperature of the mixture reached 284° C. and 20 ml. of anisole had been collected (B.P. 120°–150° C.). The heating was stopped and the distillation continued under reduced pressure until a total of 26 ml. of anisole had been collected (B.P. 120°C./250 mm. Hg). The theoretical recovery of anisole is 21.6 ml. plus 2 ml. not recovered from the initial dehydration.

The mixture was allowed to cool and water (45 ml.) added. The mixture was heated to 90° C. to dissolve the solid, and then decanted to eliminate the upper layer, consisting of Bayol 85 oil. This oil was washed four times with water (total 85 ml.) and the combined aqueous phases treated with decolourising charcoal (1 g.). The solution was heated to 80° C., filtered, and the residue washed with water (4× 10 ml.). The filtrate was concentrated at atmospheric pressure to a volume of 65 ml., cooled to just above 50° C., and acidified with concentrated hydrochloric acid (17.5 ml.). The mixture was then cooled to 5° C. and filtered. The residue was washed with ice-cold water 3× 10 ml.) and dried in vacuo at 60° C. to give 4-hydroxybenzonitrile (22 g.; 92.4% yield), M.P. 110°–111° C. (Maquenne block).

EXAMPLE XIV

A mixture of 4-cresol (3.24 g.; 0.03 mole) and 4-methoxybenzonitrile (2.66 g.; 0.02 mole) was heated in a sealed tube at 350° C. for 1½ hours. After cooling, the reaction product was analysed by gas liquid chromatography and found to contain the following:

4-hydroxybenzonitrile (52% of the proportion theoretically-expected from complete conversion)
4-methylphenyl methyl ether (52% of the proportion theoretically-expected from complete conversion)
4-methoxybenzonitrile (48% of the proportion originally present)

(The proportion of 4-cresol present in the reaction product was not determined.) The yield of 4-hydroxybenzonitrile and 4-methylphenyl methyl ether based upon the 4-methoxybenzonitrile consumed was quantitative, i.e., 100%.

The identity of the 4-hydroxybenzonitrile product was further confirmed by extraction of a sample of the crude reaction product with aqueous sodium hydroxide solution and washing the alkaline extract thoroughly with diethyl ether. The crude 4-hydroxybenzonitrile was precipitated by the addition of hydrochloric acid and extracted with diethyl ether. The ethereal extracts were evaporated to dryness and the residue recrystallised from benzene to give 4-hydroxybenzonitrile, M.P. 109°–110° C., undepressed by mixture with an authentic sample of 4-hydroxybenzonitrile prepared by another method.

The crude reaction product can be separated into its components, i.e. 4-hydroxybenzonitrile, 4-methylphenyl methyl ether, 4-methoxybenzonitrile and 4-cresol, by any convenient method, for example fractional distillation. The recovered 4-cresol and 4-methoxybenzonitrile, which may be obtained separately or as a mixture according to the method of separation employed, may be re-used in starting materials for procedures similar to those described above.

I claim:

1. Process for the preparation of hydroxybenzonitriles of the formula:

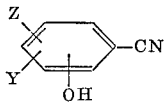

wherein Y represents hydrogen or halogen, or alkyl of from 1 through 4 carbon atoms, and Z represents hydrogen or halogen, or alkyl of from 1 through 4 carbon atoms, or alkali metal salts thereof, which comprises de-alkylating an alkoxybenzonitrile of the formula:

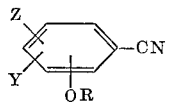

wherein R represents alkyl of from 1 through 4 carbon atoms and Y and Z are as hereinbefore defined, by heating the alkoxybenzonitrile in contact with a phenol derivative of the formula:

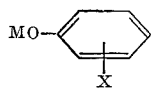

wherein M represents hydrogen or an atom of an alkali metal, and X represents hydrogen or halogen, or alkyl of from 1 through 4 carbon atoms, at a temperature from 250° to 500° C. when M represents hydrogen and at a temperature from 140° to 290° C. when M represents an atom of an alkali metal, under substantially anhydrous conditions.

2. Process according to claim 1 in which the phenol reactant is phenol or 4-cresol.

3. Process according to claim 1 in which the phenol reactant is an alkali metal phenoxide or 4-methylphenoxide.

4. Process according to claim 1 in which the alkoxybenzonitrile reactant is 4-methoxybenzonitrile, 3,5-dichloro-4-methoxybenzonitrile or 3,5-dibromo-4-methoxybenzonitrile.

5. The process according to claim 1 in which 4-methoxybenzonitrile, 3,5-dichloro-4-methoxybenzonitrile or 3,5-dibromo-4-methoxybenzonitrile is reacted with sodium phenoxide or sodium 4-methylphenoxide.

6. Process according to claim 1 wherein M represents a hydrogen atom and the reaction is carried out at a temperature between 300° and 400° C.

7. Process according to claim 6 in which the reaction is carried out under pressure.

8. Process according to claim 6 in which the reaction is carried out as a vapour phase reaction.

9. Process according to claim 1 in which the reaction is effected in an inert medium.

10. Process according to claim 9 in which the inert medium is selected from dimethylformamide, N-methylpyrrolidone and mineral oils of high boiling point.

11. Process according to claim 1 which comprises dealkylating an alkoxybenzonitrile of the formula:

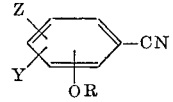

wherein R represents alkyl or from 1 through 4 carbon atoms and Y represents hydrogen or halogen or alkyl of from 1 through 4 carbon atoms and Z represents hydrogen or halogen or alkyl of from 1 through 4 carbon atoms, by heating the alkoxybenzonitrile in contact with a phenol derivative of the formula:

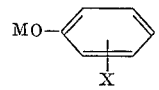

wherein M represents an atom of an alkali metal, and X represents hydrogen or halogen or alkyl of from 1 through 4 carbon atoms, at a temperature from 140° to 290° C. under substantially anhydrous conditions, and treating the alkali metal salt of the hydroxybenzonitrile product thus obtained with an acid to convert the salt into the hydroxy compound.

12. Process according to claim 11 in which the reaction is effected in an inert medium.

13. Process according to claim 11 in which the inert medium is selected from dimethylformamide, N-methylpyrrolidone and mineral oils of high boiling point.

14. Process according to claim 11 in which the phenol reactant is an alkali metal phenoxide or 4-methylphenoxide.

15. Process according to claim 11 in which the alkoxybenzonitrile reactant is 4-methoxybenzonitrile 3,5-dichloro-4-methoxybenzonitrile or 3,5-dibromo-4-methoxybenzonitrile.

16. Process according to claim 11 in which 4-methoxybenzonitrile, 3,5-dichloro-4-methoxybenzonitrile or 3,5-dibromo-4-methoxybenzonitrile is reacted with sodium phenoxide or sodium 4-methylphenoxide.

References Cited
UNITED STATES PATENTS

| | | | |
|---|---|---|---|
| 1,737,841 | 12/1929 | Hale et al. | 260—621X |
| 1,816,287 | 7/1931 | Jordan | 260—621X |

CHARLES B. PARKER, Primary Examiner

D. H. TORRENCE, Assistant Examiner

U.S. Cl. X.R.

71—105; 260—521, 612, 621, 623, 999